US012734576B2

(12) United States Patent
Ramachandra

(10) Patent No.: US 12,734,576 B2
(45) Date of Patent: Sep. 15, 2026

(54) SCREW AND A METHOD OF MANUFACTURING THEREOF

(71) Applicant: Kumar Ramachandra, Bengaluru (IN)

(72) Inventor: Kumar Ramachandra, Bengaluru (IN)

( * ) Notice: Subject to any disclaimer, the term of this patent is extended or adjusted under 35 U.S.C. 154(b) by 1113 days.

(21) Appl. No.: 17/768,600

(22) PCT Filed: Apr. 29, 2020

(86) PCT No.: PCT/IB2020/054036
§ 371 (c)(1),
(2) Date: Apr. 13, 2022

(87) PCT Pub. No.: WO2020/229926
PCT Pub. Date: Nov. 19, 2020

(65) Prior Publication Data
US 2024/0109121 A1 Apr. 4, 2024

(30) Foreign Application Priority Data
May 10, 2019 (IN) ............................ 201941018809

(51) Int. Cl.
*F16B 23/00* (2006.01)
*B21K 1/46* (2006.01)
*B21K 1/56* (2006.01)

(52) U.S. Cl.
CPC .................. *B21K 1/56* (2013.01); *B21K 1/46* (2013.01); *F16B 23/003* (2013.01)

(58) Field of Classification Search
CPC .................. F16B 23/00–23/0092; F16B 35/06
USPC .......................................... 411/403, 383, 396
See application file for complete search history.

(56) References Cited

U.S. PATENT DOCUMENTS 2,229,565 A * 1/1941 Hallowell, Jr. ......... F16B 35/00
29/DIG. 24
2,931,265 A * 4/1960 De Lacy ................. F16B 23/00
411/403
3,073,206 A * 1/1963 Rudolph ............. F16B 23/0069
81/461
3,078,754 A * 2/1963 De Lacy ................. F16B 23/00
411/968
3,898,706 A * 8/1975 Rivalland ............. B21K 1/463
470/9
4,285,380 A * 8/1981 Gulistan ............... F16B 5/0208
411/338
6,109,851 A * 8/2000 Bauer .................. C21D 9/0093
411/387.7
7,632,053 B2 * 12/2009 Matzler .................... C21D 7/02
148/587
9,421,442 B2 * 8/2016 DiMarco ................ A63B 60/52
(Continued)

*Primary Examiner* — Flemming Saether

(57) ABSTRACT

The present disclosure provides an improved screw and method of manufacturing thereof. The method comprising the steps of manufacturing 101 the screw body by cold forging process using ferrous alloy, making 102 a hole 301 on the screw head 201 to form a base of the hole and a wall thickness 501 of the screw head 201 for providing an internal drive, forming 103 a layer 602 of hard ferrous alloy in the hole 301 with the screw head 201 wherein the layer 602 having high hardness than the screw body 200, optionally smoothening 104 the layer 602 using a conventional process and machining 105 the layer 602 to obtain the internal drive 601 thereby achieving increase in hardness and wear-resistance of the internal drive 601.

8 Claims, 8 Drawing Sheets

(56) References Cited

U.S. PATENT DOCUMENTS

| | | | | |
|---|---|---|---|---|
| 10,377,020 | B2 * | 8/2019 | Campbell | B25B 23/105 |
| 12,504,032 | B2 * | 12/2025 | Serle | F16B 23/0038 |
| 2014/0023456 | A1 * | 1/2014 | Allor | F41H 5/013 470/11 |
| 2021/0108668 | A1 * | 4/2021 | Nill | F16B 5/02 |

* cited by examiner

SCREW AND A METHOD OF MANUFACTURING THEREOF

FIELD

The disclosure herein relates to an improved screw and a method of manufacturing thereof. More specifically, the disclosure relates to the method of manufacturing an improved screw for use in applications like indexable insert clamping.

BACKGROUND AND PRIOR ART

The use of screws is well established in the art. The screws are being used almost in all items made of wood, steel, aluminum etc. There are many kinds of screws previously known in the art.

Screws help to hold the things together, such as pieces of wood or metal. Compared to ordinary nails, screws provide more strength and holding power. They also form a tighter seal and unlike nails they can also be removed with ease.

There are many kinds of screws known in the art. The most commonly used constitutes of the screw head, screw-drive portion, screw shank and thread portions.

The head of the screw is the top portion and is usually wider than the rest of the screw's body. Cut into the screw's head is a special design, into which the screwdriver bit fits when driving the screw into a surface. This is known as the drive. The screw shank is the portion of the screw from below its head to where the threads begin. The screw's thread is the helical ridge that runs around its body.

Screws used in certain applications, such as indexable insert clamping, where, normally smaller screws are employed, undergo frequent usage i.e. tightening and loosening of the screw. This is unlike other screw applications. This frequent tightening and loosening action results in wearing out of screw-drive portion [referred also as internal drive] of the screw, leading to a seized screw inside the indexable cutting tool holder.

A seized screw lodged inside an indexable cutting tool holder results in: tool downtime and productivity losses, damages to the tool holder threads while attempting to remove a seized screw, damages to the insert, increased costs due to frequent screw replacements etc.

The option present as a solution in the existing prior art is to increase the hardness of the entire screw just to make the internal screw-drive more wear-resistant. But the solution results in wearing out of the indexable tool holder threads.

Therefore, there is a need in prior art to develop an improved screw and method for manufacturing the screws, which can provide increase in wear-resistance of the internal drive.

OBJECTS

Some of the objects of the present disclosure are described herein below:

A main object of the present disclosure is to provide an improved screw.

Another object of the present disclosure is to provide a method of manufacturing an improved screw.

Still another object of the present disclosure is to provide an improved screw with two dissimilar ferrous alloys.

Yet another object of the present disclosure is to provide an improved screw with two dissimilar ferrous alloys to achieve a selectively harder internal drive area compared to rest of the screw.

Still another object of the present disclosure is to provide an improved screw having the internal drive with high hardness to result in increase in wear-resistance of the internal drive.

Still another object of the present disclosure is to provide an improved screw which has only its internal drive selectively high in hardness.

Another object of the present disclosure is to provide an improved screw, which has only its internal drive selectively high in hardness with the body, made of ferrous alloy such as ultra-high strength steel.

The other objects and advantages of the present disclosure will be apparent from the following description when read in conjunction with the accompanying drawings, which are incorporated for illustration of preferred embodiments of the present disclosure and are not intended to limit the scope thereof.

SUMMARY

In view of the foregoing, an embodiment herein provides an improved screw and a method of manufacturing the same.

According to an embodiment, a method of manufacturing an improved screw comprises the steps of manufacturing the screw body by cold forging process using a ferrous alloy, making a hole on the screw head to form a base of the hole and a wall thickness of the screw head for providing an internal drive, forming a layer of hard ferrous alloy in the hole with the screw head, the layer having dissimilar material and high hardness than the screw body, and machining the layer to obtain the internal drive thereby achieving increase in hardness and wear-resistance of the internal drive. The method may optionally include smoothening the layer using a conventional process before machining the layer. In an embodiment, the hole on the screw head can be made at the time of manufacturing the screw body or the hole on the screw head can be made as an additional step. According to an embodiment, the making of the hole can include but not limited to drilling or punching.

According to an embodiment, top edge of the hole can be chamfered. In an embodiment, the forming includes press fitting a pre-hardened rod of a hard ferrous alloy in the hole to form the layer of hard ferrous alloy. In an embodiment, the press fitted pre-hardened rod is welded and joined with the screw head without the chamfered edge. In another embodiment, the press fitted pre-hardened rod is welded and joined with the screw head at the chamfered edge.

According to another embodiment, the forming includes depositing plurality layers of hard ferrous alloy in the hole to form the layer of hard ferrous alloy. In an embodiment, the deposition can be performed using a welding process or any suitable deposition process.

In an embodiment, the machining can be performed using a process, which includes but not limited to spark erosion process, and electrochemical process.

According to an embodiment, an improved screw made of two dissimilar ferrous alloys comprising of a screw head, an internal drive located on the screw head which comes in contact with a driving tool [referred herein also screw-driver], a screw body made of a ferrous alloy extending from the screw head, threads around the screw body, and only the internal drive portion of the screw head is made with a high hardness ferrous alloy compared to rest of the screw.

According to an embodiment, the screw body having ultra high strength ferrous alloys with strength more than 550 MPa.

According to an embodiment, the hardness of the internal drive of the screw can be in the range of up to 65 HRc. The internal drive of the screw is selectively high in hardness where the driving tool meets the screw, compared to the rest of the screw.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

LIST OF NUMERALS

Figure 1:
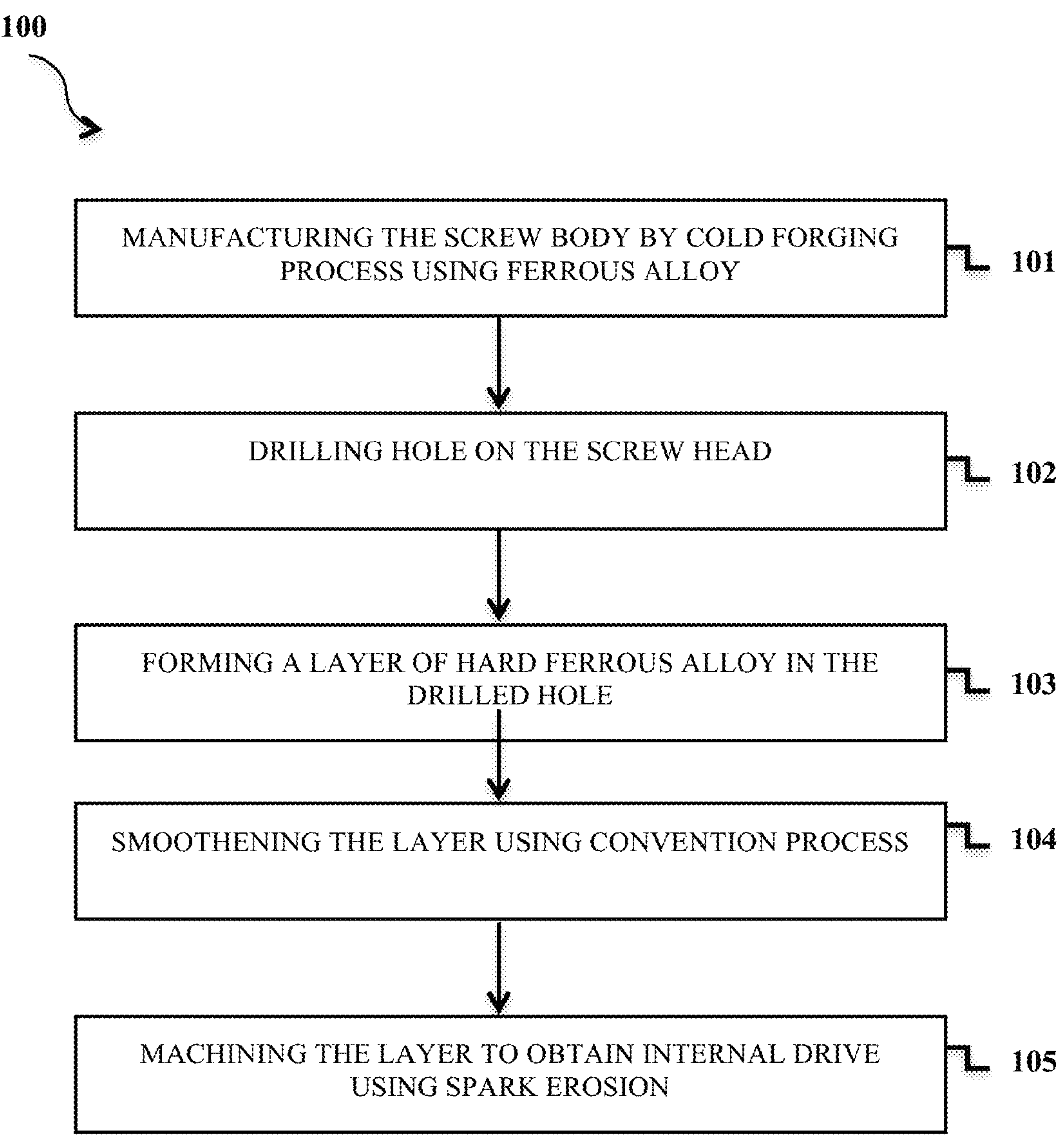
FIG. 1 illustrates a flowchart 100 for method of manufacturing an improved screw, according to an embodiment herein.

100—flowchart for method of manufacturing an improved screw
101—method for manufacturing screw body
102—making a hole
103—forming a layer
104—smoothening the layer
105—machining the layer
200—screw body without an internal drive
201—screw head
202—screw body
203—threads
204—screw head without an internal drive
300—screw body with a hole
301—hole
400A—screw body with a chamfer on edge of hole
400B—screw head with a welding
401—chamfer
402—weld
403—pre-hardened rod
500A—screw head with deposition in the hole
500B—technique of deposition in screw head
501—wall thickness
502—wire
503—diameter of wire
504—deposition
505—side wall
506—first deposited layer
507—second deposited layer
508—overlap
600—screw body with an internal drive
601—internal drive
602—layer

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need to provide an improved screw which can provide increase in wear-resistance of the internal drive, so that the productivity and savings is increased in the applications such as found in indexable insert clamping. The preferred embodiments herein achieve this by providing an improved screw that has only its internal screw-drive, at the location where a driving tool meets the screw, selectively high in hardness in the range of up to 65 HRc, while the body is made of ferrous alloy such as ultra-high strength steel. Referring now to the drawings, and more particularly to FIGS. 1 through 6, where similar reference characters denote corresponding features consistently throughout the figures, there are shown preferred embodiments.

FIG. 1 illustrates a flowchart 100 for method of manufacturing an improved screw, according to an embodiment. In an embodiment, the method for manufacturing of an improved screw comprising the steps of manufacturing 101 the screw body by cold forging process using a ferrous alloy, making 102 a hole on the screw head to form a base of the hole and a wall thickness of the screw head for providing an internal drive, forming 103 a layer of a hard ferrous alloy in the hole with the screw body, the layer having high hardness than the screw body, and machining 105 the layer to achieve the internal drive thereby achieving increase in hardness and wear resistance of the internal drive. The method may optionally include smoothening 105 the layer using a conventional process before machining 104 the layer.

In an embodiment, the machining 105 can be performed using a process which includes but not limited to spark erosion process, and electrochemical process.

Figure 2:
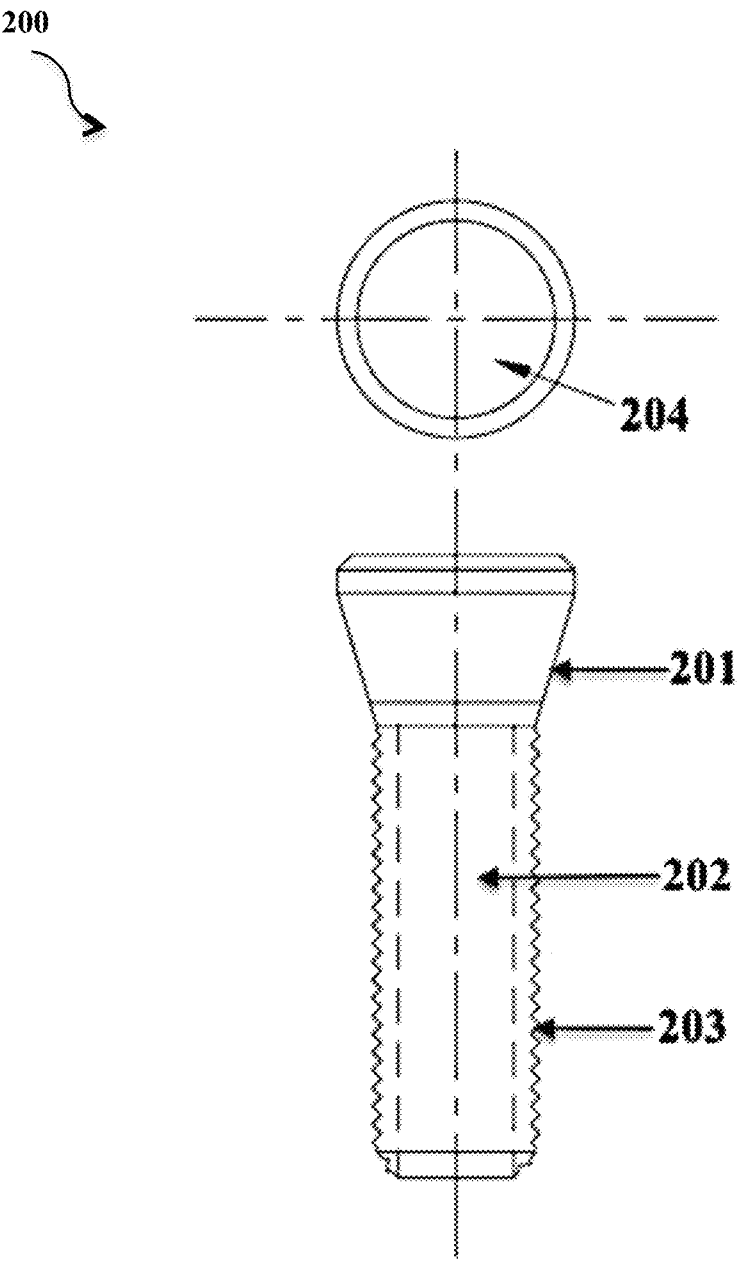
FIG. 2 illustrates a screw body without an internal drive, according to an embodiment herein.

FIG. 2 illustrates a screw body 200 without an internal drive, according to an embodiment. Further, FIG. 2 correlates to the step 101 as depicted in the flowchart mentioning the method 100 to manufacture the improved screw. The screw comprises a screw head 201, a screw body 202 and threads 203. In an embodiment, the screw body 202 can be manufactured using a cold forging machine and by conventional processes without heat treatment. Raw materials of the screw body 202 can be selected from ferrous alloys such as ultra-high strength ferrous alloys, and high strength nickel alloy wire rod. The advantage of using the ultra high strength steels or ultra high strength ferrous alloys is to reduce the problems of screw breakage when it is lodged inside the indexable tool holder.

In an embodiment, the internal drive is not provided 204 in the screw head 201 at this stage 101, and therefore the internal drive of the screw is not cold forged at this stage 101, but only the screw body 202 and head 201 is manufactured. The external threads 203 are made on the screw using any conventional thread making processes such as thread rolling, according to an embodiment.

Figure 3:
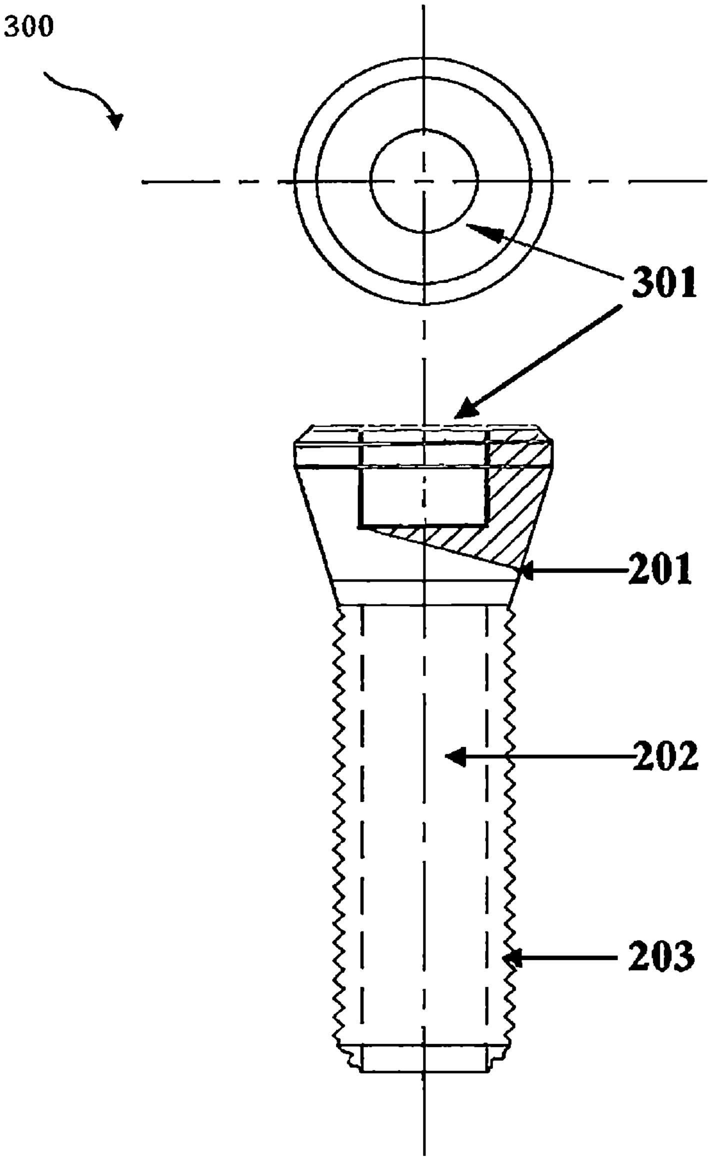
FIG. 3 illustrates the screw body with a hole, according to an embodiment herein.

FIG. 3 illustrates the screw body 300 with a hole 301, according to an embodiment. Further, FIG. 3 correlates to the step 102 as depicted in the flowchart mentioning the method 100 to manufacture the improved screw.

According to an embodiment, a hole 301 is made 102 during or after the cold forging process on the screw head 201 to form a base of the hole and a wall thickness of the screw head 201 for providing an internal drive. Further, the hole 301 is performed at the exact location where the internal drive is required on the screw. In an embodiment, the hole 301 on the screw head 201 can be made 102 during the manufacturing the screw body 202. In another embodiment, the hole 301 on the screw head 201 can be made after the manufacturing the screw body 202. In an embodiment, the size of the hole 301 may be kept slightly larger than the final dimension of the internal drive. According to an embodiment, the making 102 of the hole can include but not limited to drilling or punching. Further, the hole 301 can be drilled using any conventional drilling method or made using a punch during the cold forging process.

Figure 4A:
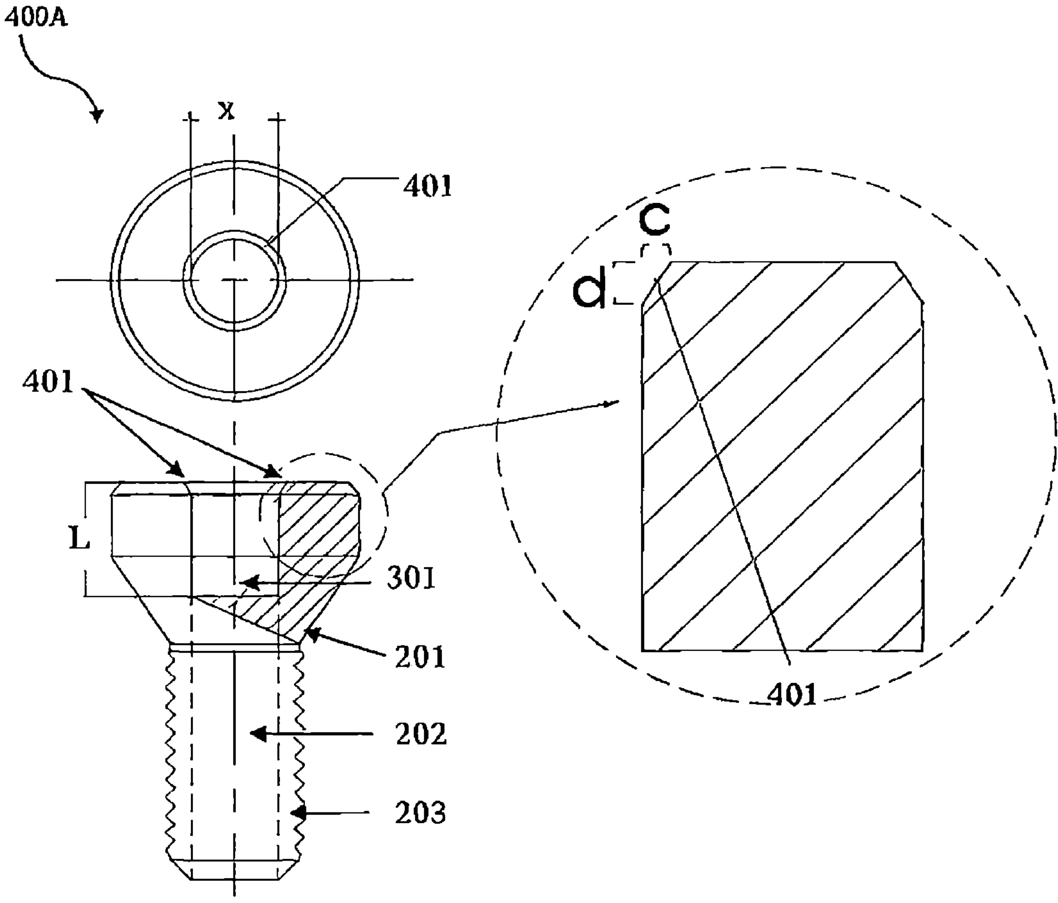
FIG. 4A illustrates a chamfer on top edge of the hole, according to an embodiment herein.
Figure 4B:
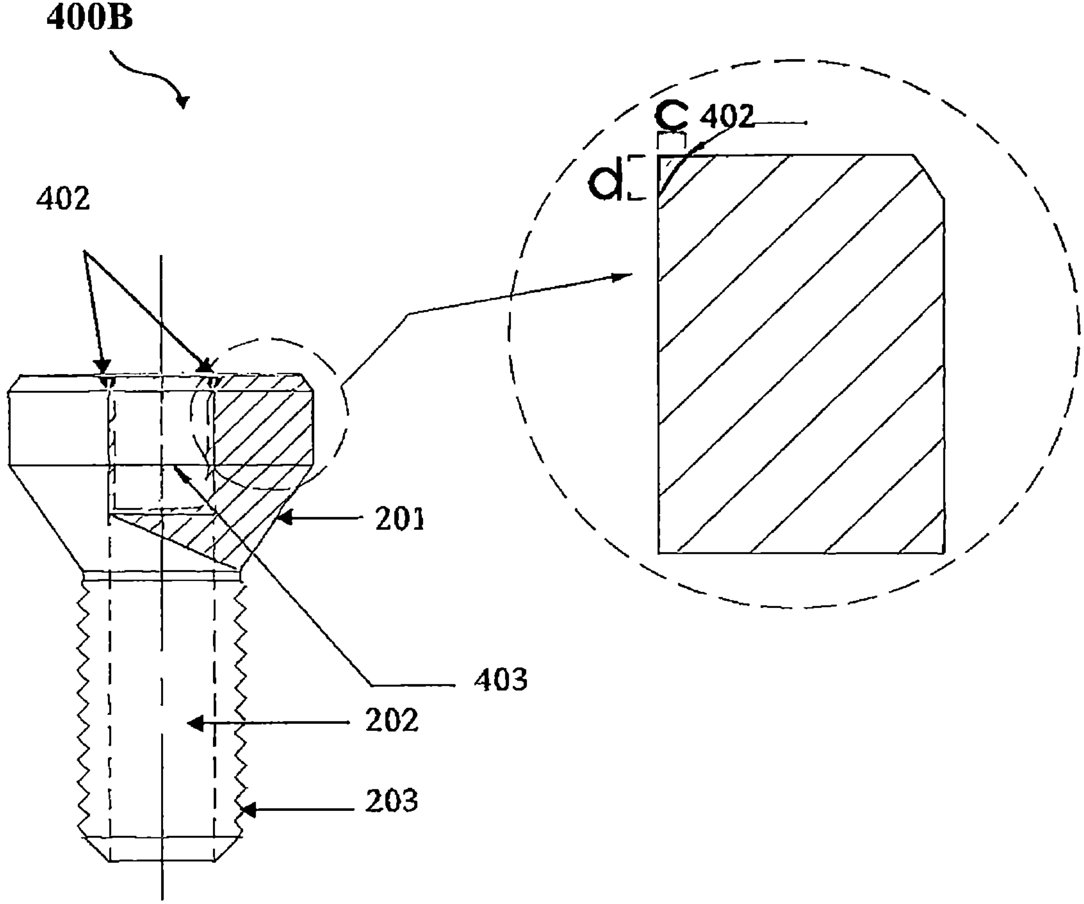
FIG. 4B illustrates a welding of a pre-hardened rod having a hard hardness alloy, according to an embodiment herein.

FIG. 4A illustrates the screw body 400A with a chamfer 401 on top edge of the drilled hole 301, and FIG. 4B illustrates the pre-hardened rod 403 welded 402 onto the screw head 400B. Further, FIGS. 4A and 4B correlate to the step 103, as depicted in the flowchart mentioning the method 100 to manufacture the improved screw. In an embodiment, the forming 103 includes press fitting the pre-hardened rod 403 made of a hard ferrous alloy in the hole 301 to form the layer of hard ferrous alloy. The chamfer 401 having width ‘d’ and depth ‘c’ is provided on top edge of the hole 301. The dimensions of the chamfer 401 can be modified according to the size of the screw. In an embodiment, the pre-hardened rod 403 is welded 402 on the chamfered edge 401 of the hole 301 for forming a layer of hard ferrous alloy by securely joining it to the screw body. The material for pre-hardened rod 403 can be chosen including but not limiting from high speed steels or any other hard steel. The pre-hardened rod 403 made of a high speed steel exhibits higher hardness and higher wear resistance. In an embodiment, the diameter of the pre-hardened rod 403 is equal to hole diameter ‘x’ and a length of the pre-hardened rod 403 is lesser than the hole length preferably the length of the pre-hardened rod 403 is lesser than the hole length 1' by approximately 30-100 microns. The pre-hardened rod 403 is press fitted in the hole 301 such that the pre-hardened rod 403 touches the base of the hole 301.

In an embodiment, the press fitted pre-hardened rod 403 is welded and joined with the screw head 201 without the chamfered edge. The welding of the pre-hardened rod 403 with the screw head 201 without the chamfered edge can be performed using a welding process that include but not limited to capacitive discharge welding, and friction stir welding. In another embodiment, the press fitted pre-hardened rod 403 is welded 402 and joined with the screw head 201 at the chamfered edge 401. The welding 402 of the pre-hardened rod 403 with the screw head 201 at the chamfered edge can be performed using a welding process that include but not limited to laser welding, GTAW using a filler wire. In a embodiment, the laser welding can be performed using a Nd:YAG laser welding machine. In a preferred embodiment, welding filler wire can be selected having high tensile strength and elongation properties, while using the welding filler wire for welding at 402. In an embodiment, diameter of the welding filler wire is approximately equal to height ‘d’ of the chamfer 401.

Figure 5A:
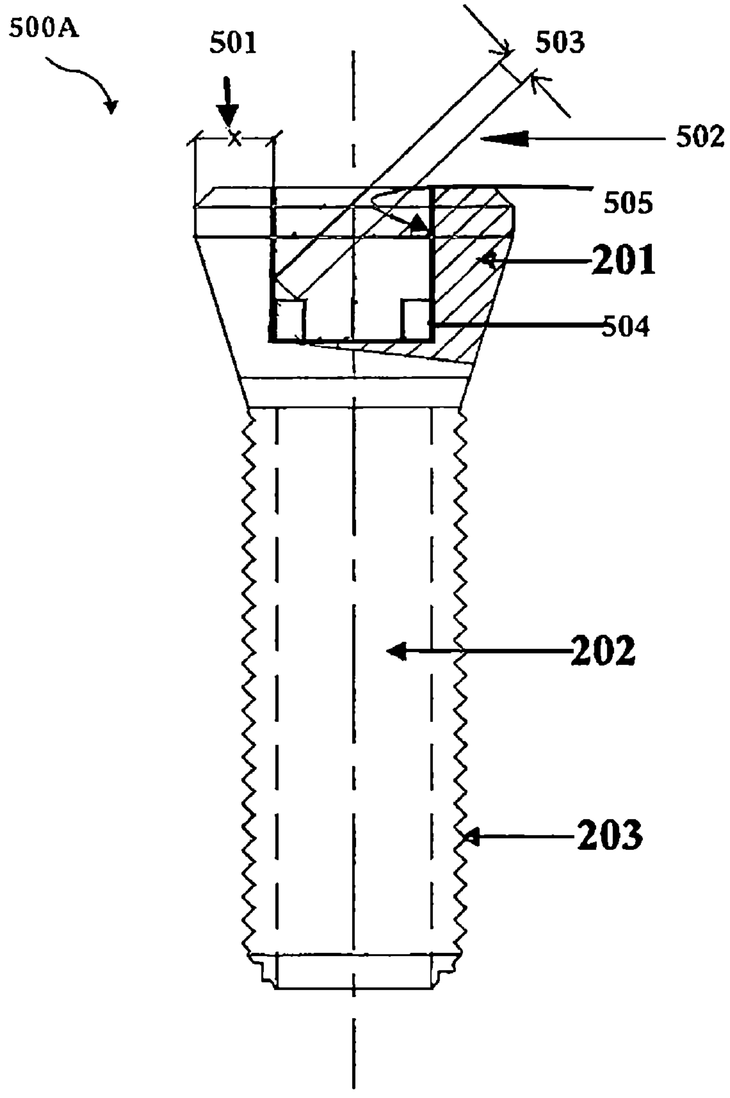
FIG. 5A illustrates the screw body with deposition in the hole, according to another embodiment herein.
Figure 5B:
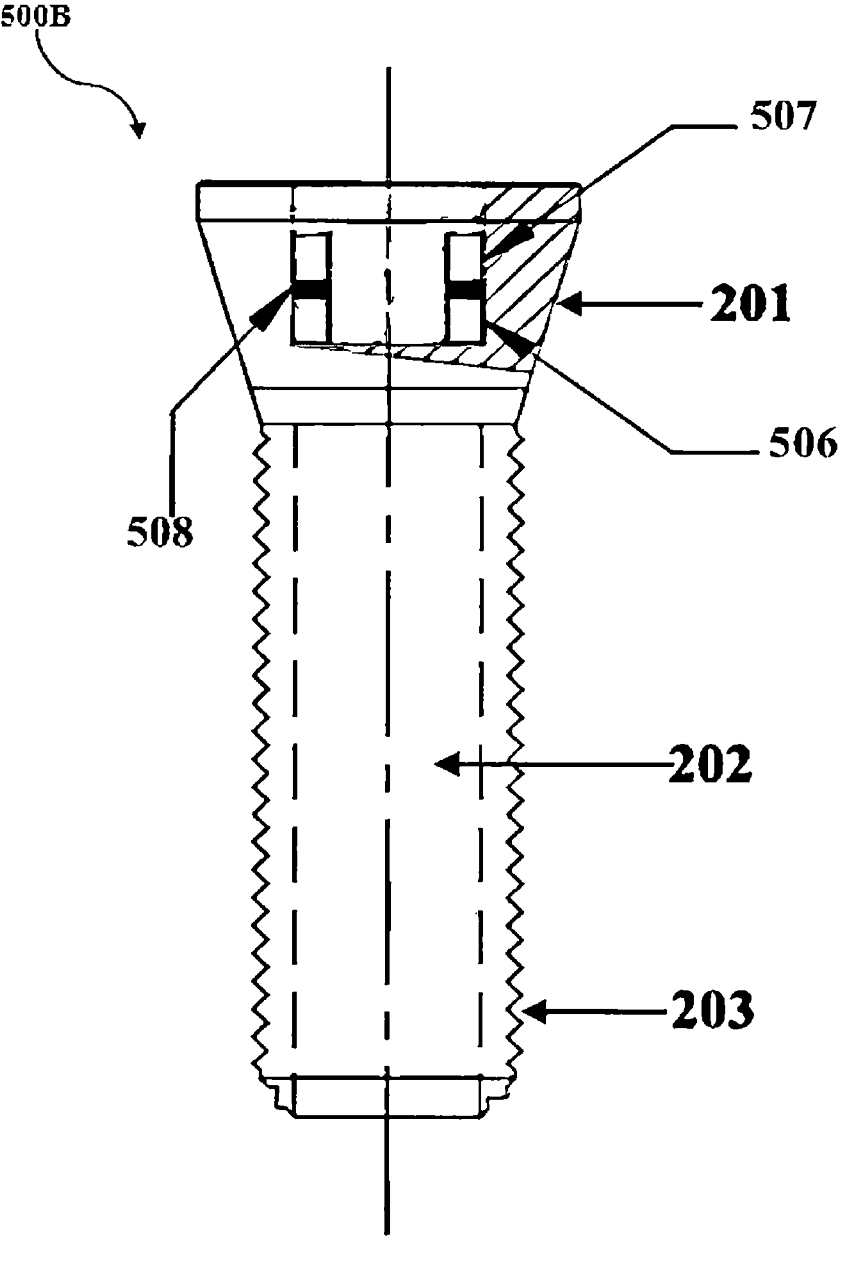
FIG. 5B illustrates the technique of deposition in the screw head, according to another embodiment herein.

FIG. 5A illustrates the screw body 500A with deposition in the hole, and FIG. 5B depicts the technique of deposition in the screw head 500B, according to an embodiment. Further, FIGS. 5A and 5B also correlate to the step 103, as depicted in the flowchart mentioning the method 100 to manufacture the improved screw.

According to an embodiment, the forming 103 includes depositing the hole 301 of the screw head 201 and filling 504 with a material having a high hardness than the screw 201 body to form the layer, wherein the material includes but not limited to a tool steel wire 502, other hard ferrous alloy, powder and so on. Further, the deposition can be performed using a welding process. In a preferred embodiment, a high-speed steel wire can be used for deposition owing to its superior hardness and metal-to-metal wear resistance. The size 503 of the wire 502 can be chosen based on the size of the screws, according to an embodiment.

In an example, smaller size screws may require smaller diameter wires 502. According to an embodiment, the diameter 503 of the wire 502 may not exceed the wall thickness 501 of the screw head 201.

According to an embodiment, the deposition of the wire 502 can be performed using a welding equipment that emits low heat just enough to weld the wires 502 on the screw. For example, Nd: Yag Laser welding machine, GTAW machine with low amperage capability (2 Amps to 15 Amps) etc.

According to an embodiment, the chosen wire 502 can be deposited by melting it using the laser pulse from the welding machine. Accordingly, the deposition can be started from base of the hole 301 moving up one layer 506 over another layer 507 as shown in FIG. 5B. In a preferred embodiment, a 20% overlap between adjacent layers 508 may be provided. Further, the deposition can be directed on the sidewall 505 instead of on the base of the hole 301. In an embodiment, the hole 301 may not be completed filled up inside, but only deposited on the sidewall 505 of the hole, thus providing deposited layer with a small centerline in the hole 301.

The step 104 as shown in FIG. 1 is related to the smoothening of the deposited surface with the help of the conventional processes. The smoothening 104 can be performed using any conventional process, for example, grinding the unevenness of the deposited surface to make it machined and smooth. This is a preparatory step prior to the step of machining the deposited layer.

Figure 6:
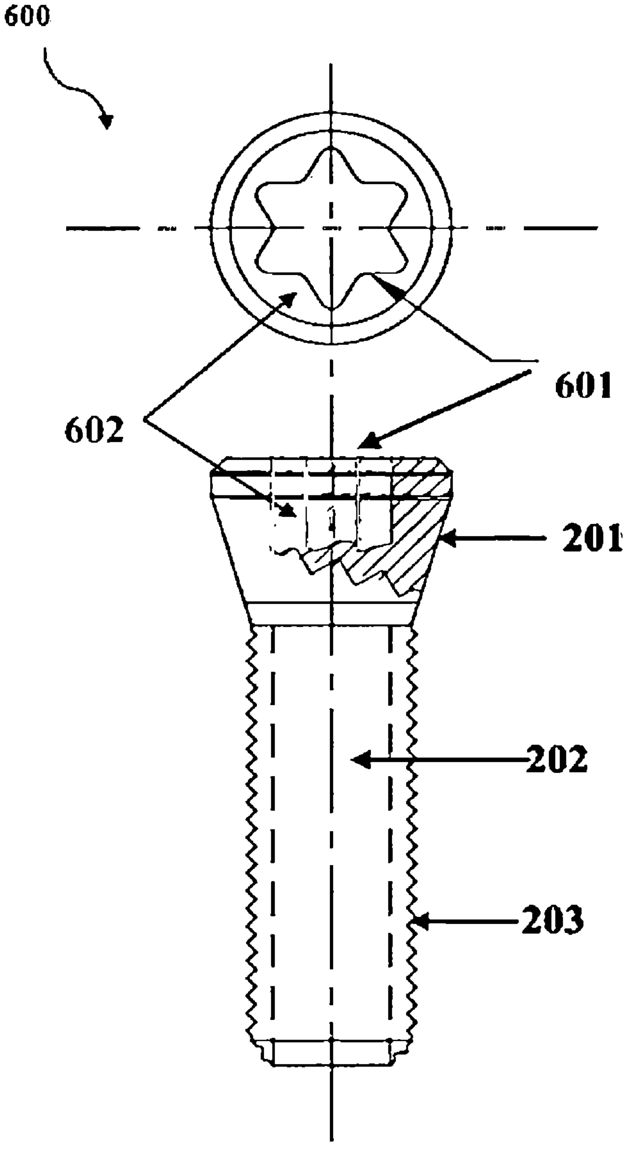
FIG. 6 illustrates the screw body with an internal drive, according to an embodiment herein.

FIG. 6 illustrates the screw body 600 with an internal drive 601 in the screw head 201, according to an embodiment. Further, FIG. 6 correlates to the step 105, as depicted in the flowchart mentioning the method 100 to manufacture the improved screw. A layer 602 of higher hardness than the screw body 202 is formed on the internal drive 601.

According to an embodiment, the hardness of the pre-hardened rod 403 can vary according to the material of the pre-hardened rod 403. Using pre hardened high speed steel rod increases hardness and wear resistance, thereby achieving high hardness and wear resistance of the layer 602 on the internal drive 601.

According to another embodiment, the deposited layers 506/507 can become hard owing to the re-melting of the tool steel wires 502. In an embodiment, the hardness of the deposit can vary according to the type of wire 502 used. Accordingly, the screw head 201 with the deposited layers 506/507 can exhibit near tool steel like hardness.

According to an embodiment, the layer 602 can be machined using a process, wherein the process includes but not limited to spark erosion process (also referred as Spark Electrical discharge machining process, spark machining, die sinking, etc) and electrochemical process to obtain an internal drive 601. In an embodiment, the layer 602 can be machined to obtain the internal drive 601 having a shape including but not limited to Hex, Hexalobular and so on.

According to an embodiment, the electrodes required for the spark EDM machining of a chosen drive can be manufactured separately using a Wire-EDM or any other conventional process.

According to an embodiment, an improved screw made of two dissimilar ferrous metals using the method 100 is provided, wherein the improved screw comprising of a screw head 201, an internal drive 601 located on the screw head 201 which comes in contact with a driving tool such as a screwdriver, a screw body 202 made of a ferrous alloy extending from the screw head 201, threads 203 around the screw body 202, and only the internal drive 601 portion of the screw head 201 is made with a dissimilar material and a high hardness ferrous alloy compared to rest of the screw.

Accordingly, the screw body 201 is made with the ferrous alloy having strength at least 550 MPa. In further embodiment, the ferrous alloy of screw body is selected from a group comprising of ultra-high strength steel alloy, nickel alloy. In an embodiment, the hardness of the internal drive 601 can be in the range of up to 65 HRc.

According to an embodiment, the screw thus manufactured has its internal drive selectively high in hardness screw in the range of up to 65 HRc while the body is made of ferrous alloy such as ultra-high strength steel.

A main advantage of the present disclosure is that the improved screw thus manufactured with selectively hardened internal drive that increases wear-resistance thus improves productivity and saves cost of the industry is provided.

Another advantage of the present disclosure is that the screws thus manufactured have higher hardness in their internal drive and because of this feature the internal screw-drive remains more wear resistant and consequently the service life of the internal screw-drive is extended by several times.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. An improved screw made of two dissimilar ferrous alloys comprising:

a screw head (201);

an internal drive (601) located in the screw head (201) and configured to receive a driving tool;

a screw body (202) made of a ferrous alloy extending from the screw head (201); and threads (203) around the screw body (202), wherein the internal drive (601) includes a hard ferrous alloy layer (602), the hard ferrous alloy layer (602) being deposited on the sidewalls of a cavity in the screw head (201) leaving a centreline void within the cavity, and wherein the hard ferrous alloy layer (602) has a higher hardness than the ferrous alloy of the screw body (202).

2. The improved screw as claimed in claim 1, wherein the screw body (202) is made of a ferrous alloy having a tensile strength of at least 550 MPa.

3. The improved screw as claimed in claim 1, wherein the internal drive (601) has a hardness up to 65 HRC.

4. The improved screw as claimed in claim 1, wherein the hard ferrous alloy layer (602) includes a deposition material selected from the group consisting of a tool steel wire, a high-speed steel wire, or a hard ferrous alloy in wire or powder form.

5. The improved screw as claimed in claim 4, wherein the deposition material is deposited on a wall of a cavity of the screw head (201) by a welding process.

6. The improved screw as claimed in claim 5, wherein the hard ferrous alloy layer (602) is formed by sequentially depositing multiple layers in an upward direction within the cavity of the screw head (201).

7. The improved screw as claimed in claim 1, wherein the internal drive (601) is formed by machining the hard ferrous alloy layer (602) using a spark erosion process or an electrochemical machining process.

8. The improved screw as claimed in claim 1, wherein the internal drive (601) has a torque-receiving shape suitable for receiving torque from the driving tool, including Hex or Hexalobular.

* * * * *